United States Patent [19]

Kozlik

[11] Patent Number: 4,551,721
[45] Date of Patent: Nov. 5, 1985

[54] METHOD FOR INITIALIZING A TOKEN-PASSING LOCAL-AREA NETWORK

[75] Inventor: Tony J. Kozlik, Phoenix, Ariz.
[73] Assignee: Honeywell Inc., Phoenix, Ariz.
[21] Appl. No.: 540,216
[22] Filed: Oct. 7, 1983
[51] Int. Cl.⁴ .............................................. H04Q 9/00
[52] U.S. Cl. .............................. 340/825.52; 340/825.5;
340/825.05; 370/85
[58] Field of Search ........... 340/825.05, 825.5, 825.16,
340/825.52; 370/85, 86

[56] References Cited

U.S. PATENT DOCUMENTS 4,410,983 10/1983 Cope ....................................... 370/85
4,491,946 1/1985 Kryskow, Jr. et al. .......... 340/825.5
4,495,493 1/1985 Segarra et al. .................... 340/825.5

Primary Examiner—Donald J. Yusko
Attorney, Agent, or Firm—A. A. Sapelli; L. J. Marhoefer; E. W. Hughes

[57] ABSTRACT

The method by which a token-passing local-area network having from two to $2^n$ modules is initialized, where n is an integer greater than zero. When connected into the network and energized, each module determines if the network is initialized and, if not, which module is to do so. Each module has a unique n bit network address. The module with the smallest network address energized before the network is initialized is identified and begins the process of initialization by transmitting tokens addressed sequentially to network addresses beginning with the next higher address than its own until a token so transmitted is accepted by an addressed module or until a token has been addressed to all network addresses other than that of the initiating module. If after tokens are transmitted to all possible network addresses other than that of the initiating module, the initiating module generates a fault signal to indicate its status.

7 Claims, 6 Drawing Figures

METHOD FOR INITIALIZING A TOKEN-PASSING LOCAL-AREA NETWORK

CROSS-REFERENCE TO RELATED APPLICATIONS

The following copending concurrently filed applications relate to the invention of the present application and are incorporated herein by reference:
A. "Plant Management System" by Russell A. Henzel Ser. No. 06/540061 filed Oct. 07, 1983; and
B. "Method for Passing a Token in a Local-Area Network" by Tony J. Kozlik Ser. No. 06/540062 filed Oct. 07, 1983.

All the foregoing are assigned to the same assignee.

BACKGROUND OF THE INVENTION

1. Field of the Invention

This invention is in the field of token-passing local-area networks and more particularly relates to an improved method by which one module of such a network initializes the network by transmitting a token to sequentially addressed module addresses of the network until a token is accepted by an addressed module.

2. Description of the Prior Art

In any token-passing local-area network where a single communication medium is shared by many modules, there must be a method by which the modules of the network when energized determine if the network is initialized and, if not, which module is to initiate forming the properly functioning modules of the network into a logical ring. In token-passing local-area networks a module which has accepted a token from another module has exclusive access to the medium to transmit information to other modules normally for a limited period of time, at the end of which period the module having the token must transfer the token to another successor module.

To do this, a special frame, a series or set of binary digits called a token pass frame, or a token, is transmitted from one module to another module around a logical ring formed of the modules of the network. The physical address of each module establishes its position and order in the ring. While a module has access to the medium, or has the token, it is permitted to transmit information, an information frame, to one or more modules of the ring before passing a token to a successor module.

To initialize a token-passing local-area network in which each of the modules is the peer or equal of all the others; i.e., there is no master, or control, module as such, particularly where several modules of a given network can be energized substantially simultaneously, there is a need to determine which of the modules so simultaneously energized is to be the initiator, or the initiating module. This is typically accomplished by some form of a contention process. When the initiating module is identified in prior art networks, the initiating module typically transmits a signal, or set of signals, which the first module to accept has the token, or the authority to transmit over the network medium.

A problem with prior art methods of initialization of token-passing local-area networks is that they lacked a systematic way of addressing each possible network position, or possible address of a module, and particularly a method which was consistent with the method of passing tokens between modules of an initialized logical ring formed by the properly functioning modules of the network.

BRIEF SUMMARY OF THE INVENTION

The present invention provides an improved method of initializing a token-passing local-area network. The local-area network can consist of from 2 to $2^n$ modules, where n is an integer greater than one. Each module has an n bit physical or network address. When connected to the common communication medium of the network, each module determines if the network is initialized as of that time by listening, or sensing, if signals are being transmitted over the medium. If signals are being transmitted, the network, or logical ring of the energized and properly functioning modules, is initialized or is in the process of being initialized. Under such circumstances, the module terminates its initialization process.

If no signals are sensed, one or more modules in the process of executing the initialization method, or procedure, will transmit a series of binary signals, logical ones, sometimes called a preamble, for a period of time which is a function of the physical address of each such module, so that if several modules start transmitting a preamble substantially simultaneously, one will transmit for a longer period of time than any of the others. Each such module after completing such a transmission listens or enables its receiver circuits to receive signals from the communication medium. If a module receives any signals while listening, that module terminates its execution of the initialization process. The module that transmits a preamble for the longest period of time and, therefore, does not receive any signals during its listening period after terminating transmission of its preamble is the initiating module.

The initiating module transmits tokens which are sequentially addressed to network addresses beginning with an address which is next in the sequence to that assigned to the initiating module and continues to transmit tokens, the destination address of each of which is a different address in the sequence until a token so transmitted is accepted by the module addressed by the token, or until a token has been transmitted addressed to all possible network positions other than that of the initiating module. If after tokens are transmitted by the initiating module to all possible network addresses other than its own and none has been accepted, the initiator module produces a fault signal to indicate that it is the only module in the network functioning properly at that time.

It is, therefore, an object of this invention to provide an improved method for initiating a token-passing local-area network.

It is yet another object of this invention to provide an improved method for initiating a token-passing local-area network in which each of the possible network addresses of modules is sequentially addressed by tokens transmitted by the initiating module.

It is yet another object of this invention to provide an improved method of initializing a local-area network which is consistent with the method utilized by each module to pass a token to its successor in an initialized network.

BRIEF DESCRIPTION OF THE DRAWINGS

Other objects, features and advantages of the invention will be readily apparent from the following description of certain preferred embodiments thereof taken in conjunction with the accompanying drawings, although variations and modifications may be effected without departing from the spirit and scope of the novel concepts of the invention and in which.

DESCRIPTION OF THE INVENTION

Figure 1:
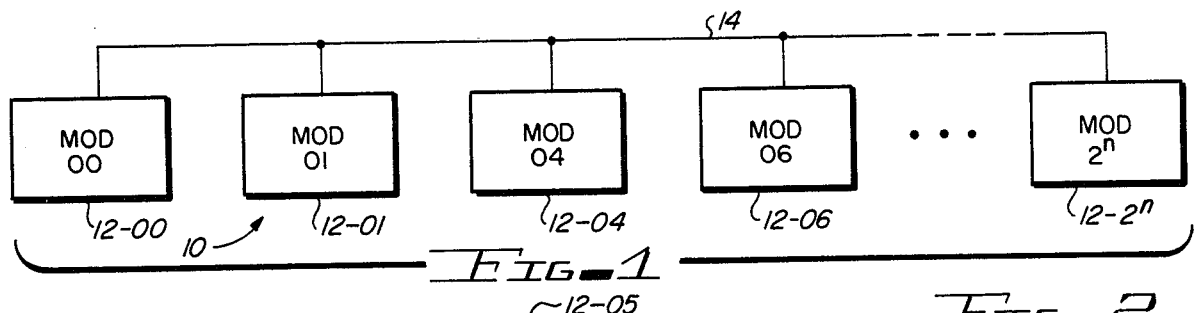
FIG. 1 is a schematic block diagram of a local-area network.
Figure 3:
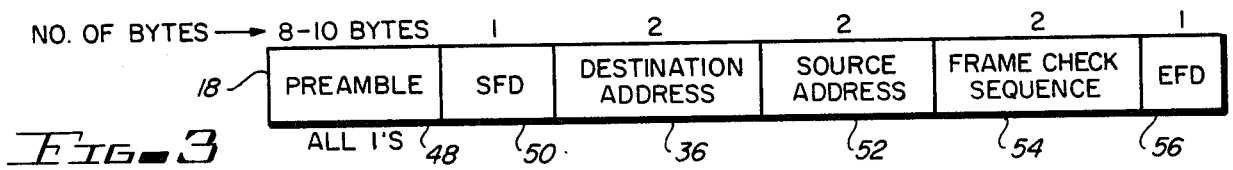
FIG. 3 illustrates the format of a token passing frame.
Figure 6:
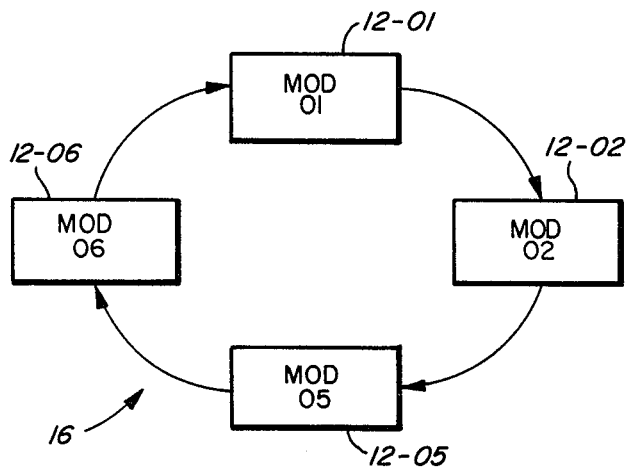
FIG. 6 illustrates a logical ring formed by the modules of an initialized token-passing local-area network.

The organization, or architecture, of local-area network 10 in which the method of this invention is practiced is illustrated in FIG. 1. Electronic modules 12-00 to 12-2$^n$ communicate with each other over communication medium, or bus 14. In network 10, each of the modules 12 is the equivalent, or the peer, of the others. Thus, in network 10 no one of modules 12 is a master module, and each of modules 12 has an equal right of access for the purpose of transmitting information over bus 14 and an equal right to initialize network 10. It should be noted that all signals transmitted over bus 14 by any of the modules 12 can be received by the other modules of the network. Each module 12 is assigned a physical address of n bits with the smallest physical address of a module 12 being 00, or more precisely seven zeros in binary notation, and the largest being $2^n$ where n is an integer greater than one. The maximum number of modules that network 10 can accommodate is $2^n$. In the preferred embodiment, n=7, so that the maximum number of modules theoretically connected to bus 14 is 128. While all the modules of network 10 are physically connected to bus 14 so as to both receive and transmit binary data, a logical ring 16 is formed, as illustrated in FIG. 6, with each module 12 transmitting a token 18 to its successor, the next module 12 in network 10 having a larger physical address in the preferred embodiment. The format of a token frame 18 is illustrated in FIG. 3.

A successor module 12 recognizes that it is the successor, or accepts a token addressed to it by its predecessor module, by transmitting any information or token frames within a predetermined period of time after receipt of the token, 4 to 9 microseconds in the preferred embodiment, and by doing so has the token. Accepting a token addressed to a given module confers on the accepting module 12 the right to transmit information over bus 14 to other modules 12. Accepting a token requires the accepting module to which the token is addressed to recognize the signals as constituting a token and that the token is addressed to it. The receipt of a token addressed to a successor module 12 from its predecessor transfers to the successor the right to transmit information over bus 14 to any or all of the modules 12 connected thereto, with a requirement that it transmit a token 18 to its successor. As stated above, a successor module is the module in ring 16 having the next larger physical address than the module having the token at any given time. In any such logical ring, the next larger address after $2^n$ is defined as being logical address 00. It should be noted that, while the maximum number of modules in logical ring 17 is 128, the minimum number is 2. Each of the modules 12 has a given function, in the preferred embodiment, such as being an operator station, a mass-memory storage subsystem, a data-processing subsystem, or an access controller which permits other devices, including other local-area networks, to communicate with network 10, etc.

Figure 2:
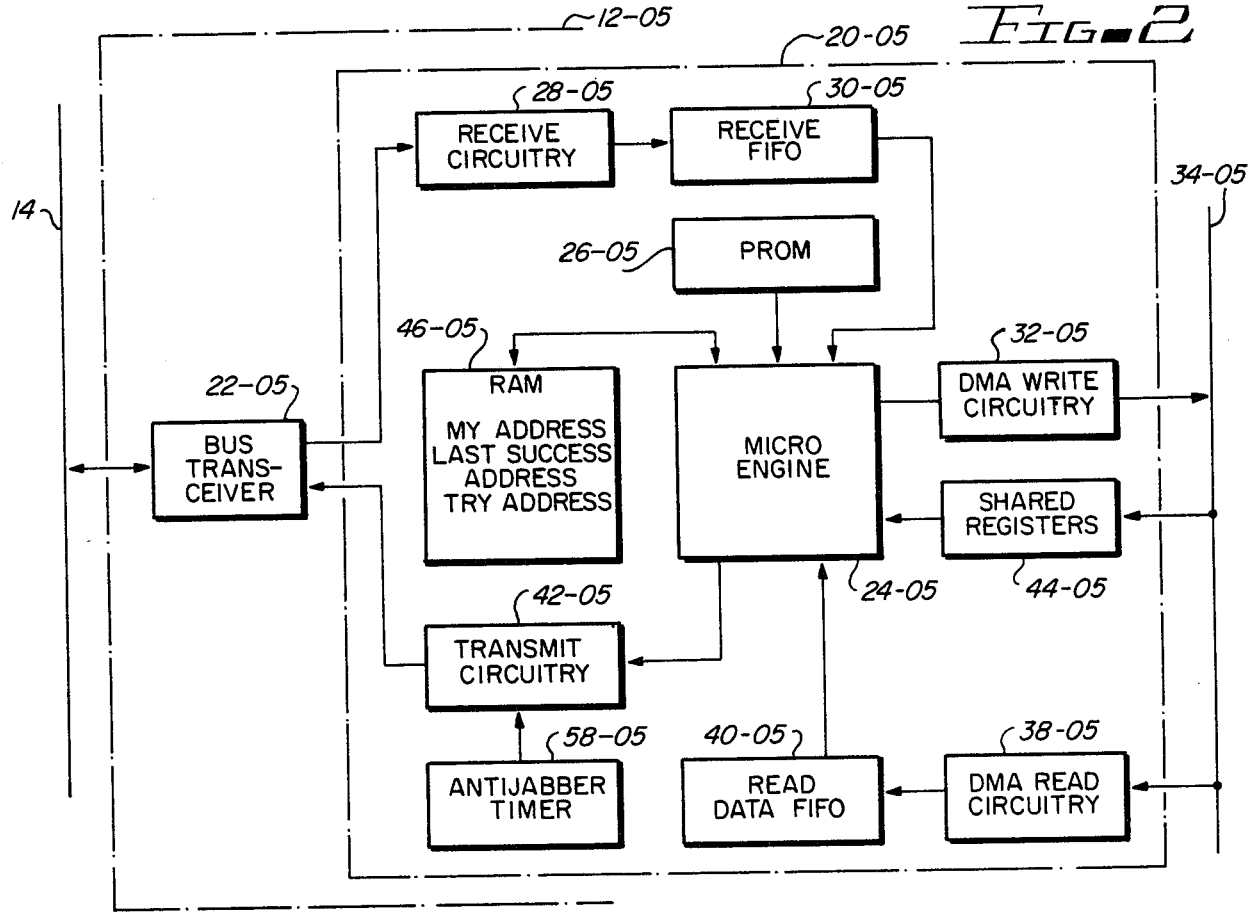
FIG. 2 is a block diagram of a bus interface unit of a module.

Each module 12, such as module 12-05, partially illustrated in FIG. 2, includes a bus interface unit, a BIU, 20-05 and a transceiver 22-05 which connects BIU 20-05 to bus 14 and is capable of transmitting data over bus 14 and of receiving data from bus 14. Transceiver 22-05, in the preferred embodiment, is transformer coupled to bus 14, and, in the preferred embodiment, bus 14 is a coaxial cable having the capability of transmitting data at a 5-megabit/second rate. BIU 20-05 is provided with a very fast microengine 24-05, one of the functions of which is to identify tokens 18 addressed to it or its module 12-05 and to transmit a token 18 to its successor, module 12-06, in logical ring 16 as illustrated in FIG. 6. Logical ring 16 consists of all the properly functioning modules 12 connected to bus 14 at any given time. In the preferred embodiment, microengine 24-05 is an 8-bit-wide arithmetic and logic unit made of bit slice components. Microengine 24-05 can execute a 24-bit microinstruction from its programmable read only memory (PROM) 26-05 in 200 nanoseconds. Microengine 24-05 also includes a crystal controlled clock which produces 5 megahertz (MHz) clock signals.

Data received from bus 14 by BIU 20-05, for example, is transmitted by bus transceiver 22-05 and receive circuitry 28-05 to receive FIFO register 30-05, which, in the preferred embodiment, stores thirty-two eight-bit bytes of data plus one parity bit for each byte. Microengine 24-05 examines the destination address fields of data information frames and token pass frames 18 received and stored in FIFO register 30-05 to determine if each frame received is addressed to it, and, if the frame is addressed to it, if it is an information frame or a token frame 18. If the received data is an information frame, then the received data is transferred by direct memory access (DMA) write circuitry 32-05 by conventional direct memory access techniques to a memory subsystem of module 12-05's CPU over module bus 34-05 and by means of which the memory subsystem and module CPU of module 20-05 directly communicate with BIU 20-05. Bus 34-05, in the preferred embodiment, is capable of transmitting sixteen data bits plus two parity bits in parallel. Module 12-05's CPU and memory subsystem are not illustrated since they are conventional.

If a received frame is a token pass frame 18 addressed to BIU 20-05; i.e., the token's destination address field 36 contains BIU 18-05 MY ADDRESS, its seven-bit physical address, microengine 24-05 will, on receipt of such a token 18 after comparing the token's destination address field 36 with its MY ADDRESS, accept the token. BIU 20-05 does this by transmitting an information frame, if one is available, to another module or to all of the modules 12 of logic ring 16 within a predetermined period of time after the receipt of the token. In doing so, microengine 24-05 causes its DMA read circuitry 38-05 to transfer data comprising the information of an information frame from the memory subsystem of module 12-05's CPU into its read data FIFO registers 40-05. Microengine 24-05 causes data from register 40-05 to be transferred to transmit circuitry 42-05 eight bits at a time once every eight instruction cycles, or clock periods, of microengine 24-05. The rate at which data is either obtained from or written into the memory subsystem of module 12-05's CPU over module bus 34-05 by the DMA circuitry 32-05 or 38-05 is up to sixteen times greater than the rate at which the data is received from bus 14 by buffer receive register 28-05 or is transmitted by transmit circuitry 42-05 and bus transceiver 22-05 to bus 14. To assure this is the case, each BIU 20 is assigned the highest priority with respect to direct memory access of the memory subsystem of its module's CPU.

Module 12-05's CPU issues commands to BIU 20-05 by writing the commands into shared registers 44-05. Microengine 24-05 processes such commands during interframe gaps or when a frame is being received that is not addressed to it. Shared registers 44-05 also contain status information that is readable by module 12-05's CPU. BIU 20-05 is also provided with a random-access memory 46-05, into which is stored the n bit physical address of module 12-05 in network 10, its MY ADDRESS. The source of the signals representing module 12-05's physical address in the preferred embodiment is a series of interconnections on the same circuit board as transceiver 22-05 of module 12-05, for example.

The format of a token pass frame 18 is illustrated in FIG. 3. Token 18 consists of a preamble 48, which is a series of from 8 to 10 bytes of logical ones. Preamble 42 is followed by a start-of-frame delimiter, SFD, 50, consisting of one byte of data. SFD 44 is followed by destination address field 36, two bytes of data which includes the n bits of the physical address of the module to which token 18 is addressed, the lower order seven bits of field 36 in the preferred embodiment. Field 36 is followed by source address field 52 of 2 bytes. Field 52 includes the physical address of the module 12 transmitting token 18, the transmitting module, or the module having the token. The source address field 52 is followed by 2-byte frame check sequence 54, an error detection code. The last byte 56 of token 16 is end-of-frame delimiter, EFD, 52.

Figure 4:
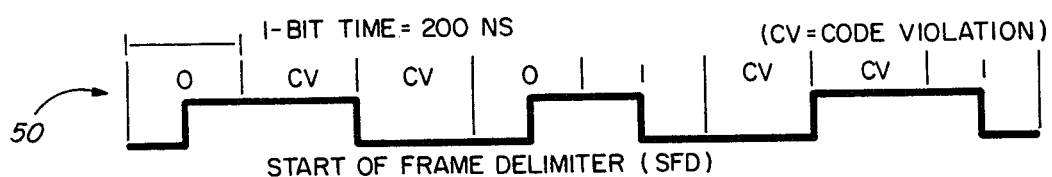
FIG. 4 illustrates the wave forms for a start-of-frame delimiter and an end-of-frame delimiter.
Figure 4:
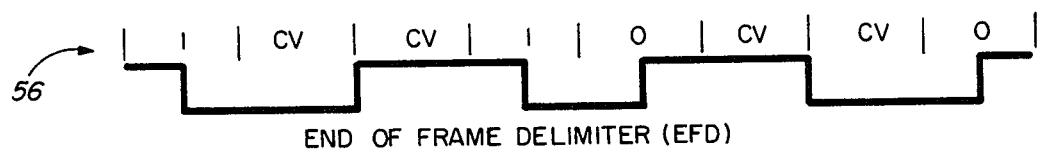

Wave forms of start-of-frame delimiter, SFD, 50 and of end-of-frame delimiter, EFD, 56 are illustrated in FIG. 4. Information transmitted by the transmit circuitry 42 of a BIU 20 of a module 12 having the token over bus 14 consists of binary signals which are Manchester encoded so that a receive clock can be derived from signals received by each receiving BIU 20. A logical zero is transmitted by the signal during the first half of a bit being low and being high during the second half of the bit, a mid-bit low-to-high transition. A logical one is transmitted by the signal during the first half of the bit being high and low during the second half, a mid-bit high-to-low transition. Manchester encoding requires that there always be a transition in the middle of each bit cell. If there is no such transition, a code violation, CV, occurs. Both start and end-of-frame delimiters 48, 56, include code violations, four CV's for each. By using CV's in this manner, a 4-bit error would have to occur to change valid data into a frame delimiter. End-of-frame delimiter 56 is used rather than silence on bus 14 because of the possibility that reflections on bus 14 would be interpreted as a transmission after transmission is in fact stopped by the module 12 having the token at any given time. Antijabber timer 58-05 prevents, or inhibits, transmit circuitry 42-05 from transmitting continuously for more than 8-20 milliseconds in the preferred embodiment, while BIU 20-05 has the token. Timer 58-05 is reset each time transmit circuitry 42-05 stops transmitting.

Figure 5:
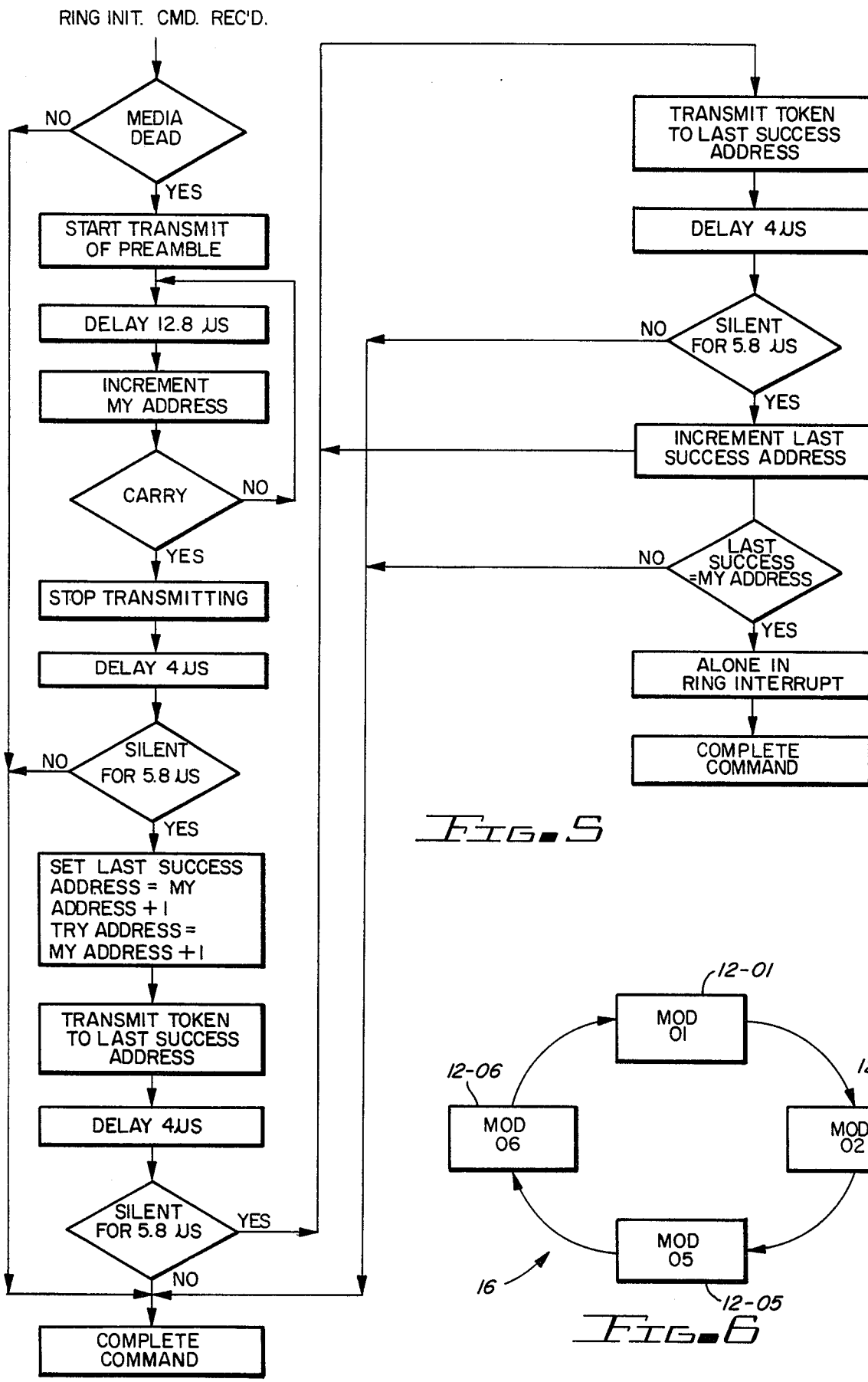
FIG. 5 is a flow diagram of the process of the invention.

At such time as module 12-05 is energized and operatively connected to bus 14, one of the first commands issued by module 12-05's CPU is a ring initialization command which is written into shared registers 44-06, and from which microengine 24-05 receives this command. Upon receipt of a ring initialization command, the BIU 20 of the module begins to perform, or execute, the initialization procedure, or method. FIG. 5 is a flow chart of the initialization method of this invention.

Each module 12, when energized and connected to bus 14, in response to the issuance of a ring initialization command issued by each module's CPU, determines if there are any signals being transmitted over bus 14, or, stated another way, is the media dead? If signals are received during a predetermined period, 25.6 microseconds in the preferred embodiment, the medium is not dead and either a logical ring 16 has been formed and is functioning or is in the process of being formed. In either case, any module 20 which senses signals being transmitted during this first listening period terminates further execution of the ring initialization sequence and completes processing of the ring initialization command by indicating to the module's CPU via shared status register 44-05 that the ring is initialized. A module after completing the ring initialization command waits, or listens, until it receives a token addressed to it, which will occur quite quickly even in a worst-case condition because of the method described in applicant's concurrently filed application entitled "Method of Passing a Token in a Local-Area Network."

If the media is silent, or dead, during the prescribed listening period, the module then starts transmitting a series of logical ones for a period of time which is a function of each module's physical address, its MY ADDRESS, more particularly an inverse function of that address. Transmit circuitry 42, when enabled to transmit by microengine 42, will in the absence of any signal being available from read FIFO 40 transmit eight logical ones serially over bus 14 for 8 clock periods of 200 nanoseconds each. To determine how long any of the modules 12 will transmit, an eight-bit counter is initialized to zero and then has loaded into it a seven-bit binary number, the MY ADDRESS of its module 12. Every 12.8 microseconds the contents of the counter are incremented by one until the counter produces a carry signal. The carry signal disables, or causes, the transmit circuitry to stop transmitting. Using this approach assures that if two or more modules begin executing ring initialization commands substantially simultaneously, the module with the lowest physical address will transmit logical one signals for a longer period of time than any other module since no two modules have the same physical address in network 10.

Each module, after transmitting a preamble, a series or sets of eight logical ones or bytes, after a delay of 4 microseconds to allow reflections of transmissions to attenuate, listens, or senses, for a second period of time, 5.8 microseconds in the preferred embodiment. If during this second listening period signals are received by the receive circuitry 28-05, the module receiving such signals during this time period knows that another module has a lower address and thus terminates its execution of the initialization method and so notifies its module's CPU by completion of the ring initialization command.

If a module does not sense, or receive, any signals during this second listening period, it knows that it is the initiating module and that it is to attempt to initialize logical ring 16 consisting of itself and at least one other module as a minimum and up to $2^n$ modules as the maximum. Before transmitting a token 18, the initiator module writes into its RAM memory as its LAST SUCCESS and TRY ADDRESSES, its MY ADDRESS plus one. It then transmits a token 18 addressed to a physical address equal to its LAST SUCCESS ADDRESS. The initiating module listens for 5.8 microseconds after a 4 microsecond delay, and, if the token is accepted by the module whose address is that contained in the destination address field 36 of the token, the initiating module has completed execution of the initialization command and terminates execution of the initialization command.

If the first token transmitted by the initiating module is not accepted, the initiating module retransmits a token, the destination address field of which is unchanged; i.e., it is its MY ADDRESS plus one. If on the second attempt the token is accepted, the initiating module terminates its execution of the initializing command. If not, the destination address is incremented and a token is transmitted utilizing that incremented destination address. Any time a token is accepted by the addressed module, the initiating module terminates the method by completion of the ring initialization command; otherwise, it continues sending tokens, the destination address fields of which are incremented by one for each subsequent transmission of a token.

Before transmitting a token with an incremented destination address field, a check, or comparison, is made between the incremented destination address and the MY ADDRESS of the initiating module. If the address field of a token to be transmitted equals the MY ADDRESS of the initiating module, the initiating method is terminated and, in addition, an alone in the ring interrupt signal is produced by the microengine 24 of the module which interrupt signal is transmitted to the module's CPU for processing in accordance with the appropriate fault-handling program of the module's CPU.

From the foregoing, it is obvious that the method of this invention provides an efficient way for a module of a token-passing local-area network to determine if the network of which it is a part is initialized and, if not, of determining which module is to undertake the initialization of a logic ring by transmitting the first token. The method is compatible with the method by which tokens are passed between modules once the logic ring of the network is initialized.

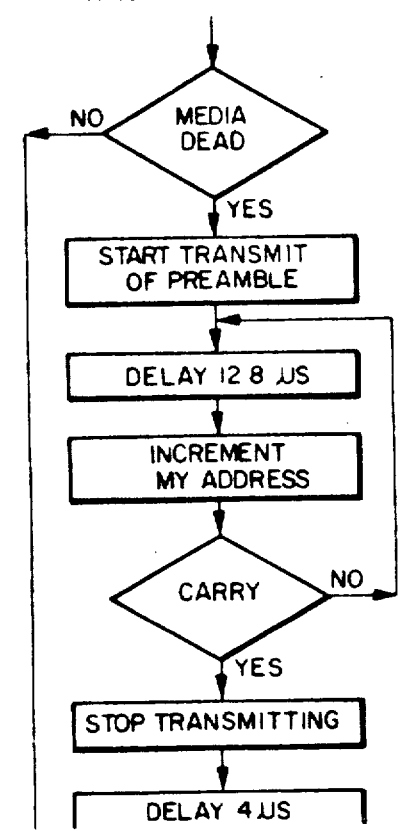
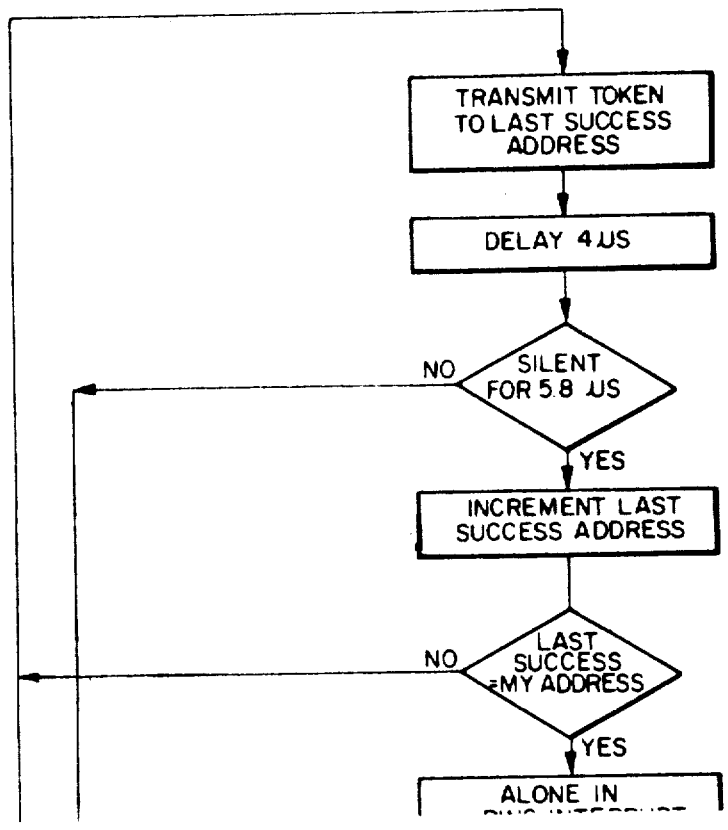

What is claimed is:

1. The method of initializing a token-passing local-area network which includes a plurality of modules communicating with one another over a common bus, with each module having a unique network address, comprising the steps of:
    (1) each module listening for a predetermined period of time for any transmissions of signals on the bus;
    (2) transmitting, if no signals are heard during step 1, for a period of time which is a function of each module's address;
    (3) listening after a fixed delay for a fixed period of time after terminating transmission under step 2;
    (4) the module that hears nothing in step 3, transmitting tokens sequentially addressed to each network address until a token is accepted by an addressed module; and
    (5) the module performing step 4 producing a fault signal and terminating initializaton if the network address of a token to be transmitted in step 4 is that of the module performing step 4.

2. The method of initializing a token-passing local-area network in which the network comprises a plurality of electronic modules communicating with one another over a common bus, with each module having a unique network address, its MY ADDRESS, comprising the steps of:
    (1) each module sensing if any signals are transmitted over a bus for a first period of time;
    (2) each module transmitting signals, if no signals are sensed during step 1, over the bus for a period of time which is a function of each module's address;
    (3) each module after completing step 2 determining after a predetermined delay during a second period of time if any signals are transmitted over the bus;
    (4) the module that does not sense any signals during step 3, the initiating module, transmitting a token addressed to a module whose address is that of the transmitting module modified by one;
    (5) the initiating module determining if the token transmitted in step 4 is accepted by a module to which the token is addressed;
    (6) if the token is not accepted by the addressed module, incrementing the address of the token by one;
    (7) determining if the incremented address of the token equals the address of the initiating module;
    (8) transmitting a token with the incremented address if the incremented address does not equal the address of the initiating module and determining if the token transmitted is accepted by a module;
    (9) repeating steps 6, 7 and 8 until a token is accepted by an addressed module or the incremented address equals the address of the initiating module;
    (10) terminating initialization when a module accepts a token; and
    (11) issuing an interrupt signal if the incremented address of a token equals the address of the initiating module.

3. The method of initializing a token-passing local-area network which can include up to $2^n$ bits of electronic modules where "n" is an integer other than zero, communicating with one another over a common bus, with each module having its own unique n bit MY ADDRESS and the capability of forming and identifying its n bit LAST SUCCESS ADDRESS, comprising the steps of:
    (1) each module sensing if any binary signals are transmitted over the bus during a first period of time;
    (2) any module terminating initialization if it senses any signals in step 1;
    (3) each module not terminating initialization in step 2 transmitting binary signals over the bus for a period of time which is an inverse function of its MY ADDRESS;
    (4) each module performing step 3 sensing for a third period of time after a delay for a second period of time if any binary signals are being transmitted over the bus;
    (5) each module performing step 4 terminating initialization if it senses any binary signals being transmitted on the bus during said third period;
    (6) the module not terminating initialization in step 5, the initializing module, setting its LAST SUCCESS ADDRESS to equal its MY ADDRESS plus one and transmitting a token addressed to its LAST SUCCESS ADDRESS;

(7) the initializing module terminating initialization if the token transmitted in step 6 is accepted by the addressed module;

(8) the initializing module transmitting a token addressed to its LAST SUCCESS ADDRESS a second time if the token transmitted in step 6 is not accepted by the addressed module;

(9) the initializing module terminating initialization if the token transmitted in step 8 is accepted by the addressed module;

(10) the initializing module incrementing its LAST SUCCESS ADDRESS and transmitting a token addressed to its incremented LAST SUCCESS ADDRESS if the token transmitted in step 8 is not accepted by the addressed module;

(11) terminating initialization if the token transmitted in step 10 is accepted by the addressed module;

(12) repeating step 10 until a token is accepted by an addressed module or the incremented LAST SUCCESS ADDRESS equals its MY ADDRESS; and

(13) generating an alone in the ring interrupt if the incremented LAST SUCCESS ADDRESS of step 10 equals the initializing module's MY ADDRESS.

4. The method of claim 3 in which n=seven.

5. The method of claim 4 in which the first period of time is substantially 25 microseconds.

6. The method of claim 5 in which the second period of time is substantially four microseconds.

7. The method of claim 6 in which the third period of time is substantially 5.8 microseconds.

* * * * *

UNITED STATES PATENT AND TRADEMARK OFFICE
CERTIFICATE OF CORRECTION

PATENT NO. : 4,551,721

DATED : November 5, 1985

INVENTOR(S) : Tony J. Kozlik

Page 1 of 2

It is certified that error appears in the above-identified patent and that said Letters Patent is hereby corrected as shown below:

In the drawing, sheet 2, figure 5, the line extending horizontally from the block labelled "INCREMENT LAST SUCCESS ADDRESS" should be deleted. Also, in the same figure, the "NO" line extending horizontally from the decision block labelled "LAST SUCCESS= MY ADDRESS" should extend to the left to the next vertical line.

A portion of the figure 5 should appear as shown on the attached sheet.

Signed and Sealed this

Eleventh Day of November, 1986

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,551,721

DATED : November 5, 1985

INVENTOR(S) : Tony J. Kozlik

It is certified that error appears in the above-identified patent and that said Letters Patent is hereby corrected as shown below: